(12) United States Patent
Kim et al.

(10) Patent No.: US 8,780,430 B2
(45) Date of Patent: Jul. 15, 2014

(54) DISPLAY APPARATUS

(75) Inventors: Yong Seok Kim, Seoul (KR); Seon-Tae Yoon, Seoul (KR); Jae Byung Park, Seoul (KR); Haeil Park, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 325 days.

(21) Appl. No.: 13/405,435

(22) Filed: Feb. 27, 2012

(65) Prior Publication Data

US 2013/0077145 A1 Mar. 28, 2013

(30) Foreign Application Priority Data

Sep. 27, 2011 (KR) ........................ 10-2011-0097716

(51) Int. Cl.
| | | |
|---|---|---|
| *G02B 26/02* | (2006.01) | |
| *G02B 26/08* | (2006.01) | |
| *G02B 26/04* | (2006.01) | |

(52) U.S. Cl.
CPC ............ *G02B 26/02* (2013.01); *G02B 26/0841* (2013.01); *G02B 26/04* (2013.01)
USPC .......................................... 359/234; 359/230

(58) Field of Classification Search
CPC .... G02B 26/02; G02B 26/04; G02B 26/0841; G02B 26/085

USPC .......................................... 359/230, 233–236
IPC .............................. G02B 26/02,26/04, 26/0841
See application file for complete search history.

(56) References Cited

U.S. PATENT DOCUMENTS

| | | | |
|---|---|---|---|
| 7,864,404 B2 | 1/2011 | Cho et al. | |
| 2010/0188443 A1* | 7/2010 | Lewis et al. | 345/691 |
| 2011/0043882 A1 | 2/2011 | Yoon et al. | |
| 2012/0229966 A1* | 9/2012 | Kim et al. | 361/679.01 |

FOREIGN PATENT DOCUMENTS

JP 2008532069 8/2008

* cited by examiner

*Primary Examiner* — James Phan
(74) *Attorney, Agent, or Firm* — F. Chau & Associates, LLC

(57) ABSTRACT

A display apparatus includes a first substrate and a second substrate. The first substrate includes a light blocking layer and the second substrate includes a shutter part. The shutter part includes first, second, third, and fourth operators and a shutter. The first, second, third, and fourth operators are operated independently from each other in response to first, second, third, and fourth voltages, respectively. The shutter is connected to the first to fourth operators to be rotationally moved. Thus, the display apparatus display may display various gray scales.

21 Claims, 16 Drawing Sheets

DISPLAY APPARATUS

CROSS-REFERENCE TO RELATED APPLICATION

This application claims priority to Korean Patent Application No. 10-2011-0097716 filed on Sep. 27, 2011, the contents of which are herein incorporated by reference in its entirety.

TECHNICAL FIELD

The embodiments of the present invention relate to a display apparatus, and more particularly, to a display apparatus including a microelectromechanical shutter.

DISCUSSION OF THE RELATED ART

There are various display apparatuses, such as a liquid crystal display (LCD), a plasma display panel (PDP), an organic light emitting display (OLED), a field effect display (FED), an electrophoretic display (EPD), a microelectromechanical system (MEMS) display, etc.

The MEMS display uses a micro-shutter and exhibits relatively high light utilization efficiency, and fast switching capability. Since the micro-shutter is deformed by electrostatic force caused by an electric field, the MEMS display transmits or blocks light using the deformation property of the micro-shutter. Accordingly, the MEMS display is able to provide a relatively fast response speed when a driving voltage is applied at a low level.

A MEMS display operates in an on or off mode, and displays gray scales with a time-division method. However, the time-division method must charge or discharge all pixels in a relatively short time, so fast driving, requiring various complex processes, such as a low temperature polycrystalline silicon (LTPS) process, an oxidation semiconductor process, etc., is needed

SUMMARY

Exemplary embodiments of the present invention provide a MEMS display capable of displaying gray scales.

According to the exemplary embodiments, a display apparatus includes a first insulating substrate, a light blocking layer disposed on the first insulating substrate and including a first opening through which light is capable of being transmitted, a second insulating substrate facing the first insulating substrate, and a shutter part disposed on the second insulating substrate.

The shutter part includes a shutter provided with a second opening formed through the shutter, a first operator and a second operator disposed adjacent to a first side of the shutter to move the shutter, a third operator and a fourth operator disposed adjacent to a second side of the shutter to move the shutter. The first, second, third, and fourth operators are operated independently from each other in response to first, second, third, and fourth voltages, respectively.

The shutter has a rectangular shape with a pair of long sides and a pair of short sides when viewed in a plan view. The long sides include a first long side facing the first and second operators and a second long side facing the third and fourth operators.

Each of the first, second, third, and fourth operators includes a driving beam electrode applied with a corresponding voltage of the first, second, third, and fourth voltages and a deformable electrode connected to the shutter, facing the driving beam electrode, and moving when the corresponding voltage is applied to the driving beam electrode.

The driving beam electrodes include first, second, third, and fourth driving beam electrodes respectively corresponding to the first, second, third, and fourth operators, and the deformable electrodes include first, second, third, and fourth deformable electrodes respectively corresponding to the first, second, third, and fourth operators.

The first deformable electrode is integrally formed with the second deformable electrode and the third deformable electrode is integrally formed with the fourth deformable electrode.

The shutter is rotated from a position before at least one of the first, second, third, or fourth voltages is applied to move toward at least one operator of the first, second, third, or fourth operators by applying at least one of the first, second, third, or fourth voltages.

Each of the first, second, third, and fourth deformable electrodes is bent at least one time.

According to the embodiments, a shortest distance from first end portions of the first and second driving beam electrodes to the first long side of the shutter in a first direction of the shutter is shorter than a shortest distance from second end portions of the first and second driving beam electrodes to the first long side of the shutter in the first direction, and a shortest distance from first end portions of the third and fourth driving beam electrodes to the second long side of the shutter in the first direction is shorter than a shortest distance from second end portions of the third and fourth driving beam electrodes to the second long side of the shutter in the first direction.

According to the embodiments, a rotational angle when the shutter is rotated to move toward the first and fourth operators from a position before at least one voltage is applied is different from a rotational angle when the shutter is rotated to move toward the second and third operators from the position before the at least one voltage is applied.

According to the embodiments, at least one driving beam electrode of the first, second, third, and fourth driving beam electrodes is asymmetrical with remaining driving beam electrodes of the first, second, third, and fourth driving beam electrodes with respect to a first line crossing a center portion of the long sides, a second line crossing a center portion of the short sides, and a crossing point at which the first line meets the second line.

According to the embodiments, at least one of the first, second, third, or fourth driving beam electrodes has a length different from remaining driving beam electrodes of the first, second, third, and fourth driving beam electrodes.

According to the embodiments, at least one deformable electrode of the first, second, third, or fourth deformable electrodes is asymmetrical with remaining deformable electrodes of the first, second, third, and fourth deformable electrodes with respect to a first line crossing a center portion of the long sides, a second line crossing a center portion of the short sides, and a crossing point at which the first line meets the second line.

According to the embodiments, at least one of the first, second, third, or fourth deformable electrodes has a length different from remaining deformable electrodes of the first, second, third, and fourth driving beam electrodes.

According to the embodiments, the shutter part further includes first, second, third, and fourth driving beam supporters disposed on the second insulating substrate to respectively support the first, second, third, and fourth driving beam electrodes, and first, second, third, and fourth deformable electrode supporters disposed on the second insulating substrate to respectively support the first, second, third, and fourth deformable electrodes.

According to the embodiments, at least one driving beam supporter of the first, second, third, and fourth driving beam supporters is asymmetrical with remaining driving beam supporters of the first, second, third, and fourth driving beam supporters with respect to a first line crossing a center portion of the long sides, a second line crossing a center portion of the short sides, and a crossing point at which the first line meets the second line.

According to the embodiments, at least one deformable electrode supporter of the first, second, third, and fourth deformable electrode supporters is asymmetrical with remaining deformable electrode supporters of the first, second, third, and fourth deformable electrode supporters with respect to a first line crossing a center portion of the long sides, a second line crossing a center portion of the short sides, and a crossing point at which the first line meets the second line.

According to the embodiments, the first, second, third, and fourth voltages are respectively applied to the shutter part by an inverter circuit.

According to the embodiments, at least one first opening is provided and has a polygonal shape, a circular shape, an oval shape, an S shape, or an irregular shape, and at least one second opening is provided and has a polygonal shape, a circular shape, an oval shape, an S shape, or an irregular shape.

According to the embodiments, the first opening has a shape different from a shape of the second opening.

A display apparatus, according to an embodiment of the present invention, comprises a first insulating substrate, a light blocking layer disposed on the first insulating substrate and including a first opening through which light is capable of being transmitted, a second insulating substrate facing the first insulating substrate, and a shutter part disposed on the second insulating substrate, the shutter part comprising a shutter provided with a second opening formed through the shutter, a first operator disposed adjacent to a first side of the shutter to move the shutter, and a second operator disposed adjacent to a second side of the shutter to move the shutter, wherein the shutter rotates toward the first operator at a first angle with respect to a reference point in response to a first voltage, and rotates toward the second operator at a second angle with respect to the reference point in response a second voltage to partially overlap the first opening with the second opening.

According to the embodiments of the present invention, the display apparatus may display not only the gray scales of the turn-on and turn-off states but also an intermediate gray scale or at least two intermediate gray scales different from each other.

BRIEF DESCRIPTION OF THE DRAWINGS

The embodiments of the present invention will become readily apparent by reference to the following detailed description when considered in conjunction with the accompanying drawings wherein.

DETAILED DESCRIPTION

Exemplary embodiments of the present invention will be described more fully hereinafter with reference to the accompanying drawings. However, the present invention may be embodied in various different ways and should not be construed as limited to the exemplary embodiments described herein.

It will be understood that when an element or layer is referred to as being "on", "connected to" or "coupled to" another element or layer, it can be directly on, connected or coupled to the other element or layer or intervening elements or layers may be present. Like numbers may refer to like elements throughout. As used herein, the term "and/or" includes any and all combinations of one or more of the associated listed items.

As used herein, the singular forms, "a", "an" and "the" are intended to include the plural forms as well, unless the context clearly indicates otherwise.

Figure 1:
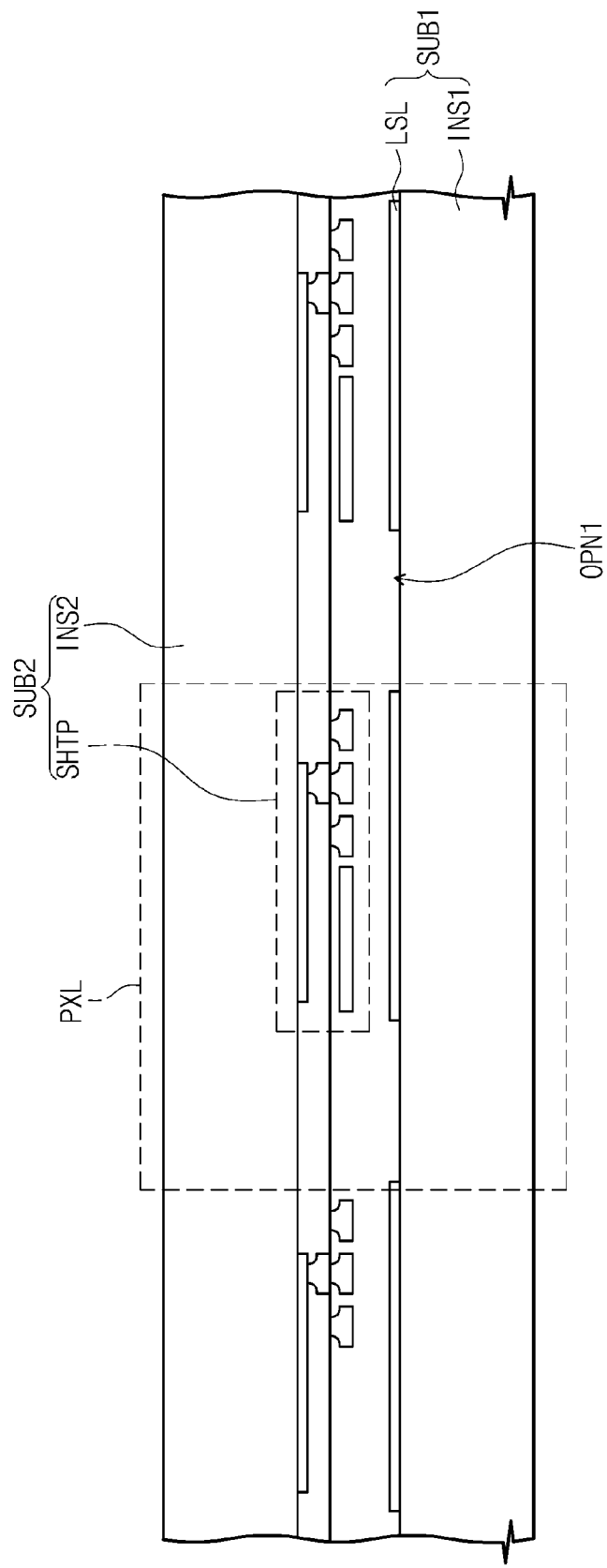
FIG. 1 is a cross-sectional view showing a display apparatus according to an exemplary embodiment of the present invention.
Figure 2:
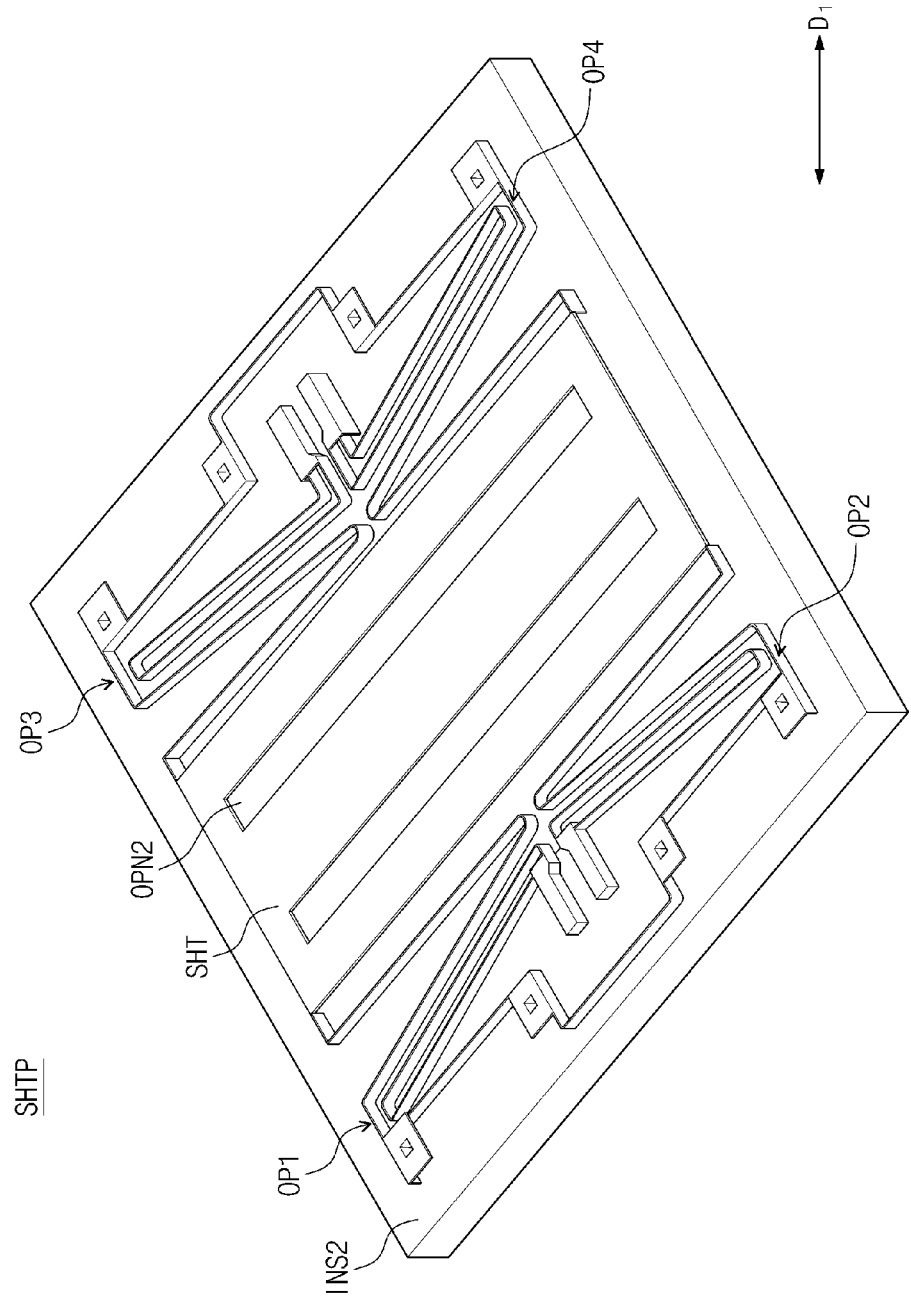
FIG. 2 is a perspective view showing a shutter part according to an exemplary embodiment of the present invention.

FIG. 1 is a cross-sectional view showing a display apparatus according to an exemplary embodiment of the present invention and FIG. 2 is a perspective view showing a shutter part according to an exemplary embodiment of the present invention.

Referring to FIG. 1, a display apparatus includes a plurality of pixels PXL. In FIG. 2, for the convenience of explanation, a shutter part corresponding to one pixel PXL is shown. According to an embodiment, the pixels PXL included in the display apparatus are arranged in a matrix form in rows and columns.

Referring to FIGS. 1 and 2, the display apparatus includes a first substrate SUB1 and a second substrate SUB2.

The first substrate SUB1 includes a first insulating substrate INS1 and a light blocking layer LSL disposed on the first insulating substrate INS1.

The first insulating substrate INS1 is formed of a transparent insulating material, such as glass, plastic, crystal, etc.

The light blocking layer LSL is disposed on the first insulating substrate INS1. The light blocking layer LSL reflects or absorbs light. The light may be provided from an outside source. For instance, the light blocking layer LSL may reflect light traveling upward from under the light blocking layer and absorb light traveling downward from over the light blocking layer LSL. In the present exemplary embodiment, the light blocking layer LSL has a single layer structure, but is not limited thereto. For example, the light blocking layer LSL may have a multi-layer structure of a light reflecting layer and a light absorbing layer. In this case, the light reflecting layer is disposed on the first insulating substrate INS1 and the light absorbing layer is disposed on the light reflecting layer. The light reflecting layer may be a metal layer or a dielectric mirror including a plurality of dielectric layers having different refractive indices. The light absorbing layer may be formed of various materials, e.g., a mixture of chromium (Cr) and chromium oxide (CrOx).

The light blocking layer LSL includes a plurality of openings OPN1 (referred to herein as first openings) to provide an optical path through which the light travels. The light traveling through paths except for the first openings OPN1 is reflected or absorbed by the light blocking layer LSL. Particularly, in the case that a light source (not shown) is disposed under the first insulating substrate INS1 to provide the light to the display apparatus, the light blocking layer LSL reflects or absorbs the light emitted from the light source and traveling upward toward the light blocking layer LSL. At least one first opening OPN1 is provided and may have various shapes, such as a polygonal shape, a circular shape, an oval shape, an S shape, an irregular shape, etc. According to an embodiment, when a plurality of first openings OPN1 are provided, at least one of the first openings OPN1 has a different shape from the others.

In the present exemplary embodiment, two first openings OPN1 are shown to have the same size, but the number and shape of the first openings OPN1 is not limited thereto.

The second substrate SUB2 includes a second insulating substrate INK and at least one shutter part SHTP.

The second insulating substrate INS2 is disposed spaced apart from the first insulating substrate INS1 to face the first insulating substrate INS1. The second insulating substrate INS2 is formed of a transparent insulating material, such as glass, plastic, crystal, etc.

Figure 3:
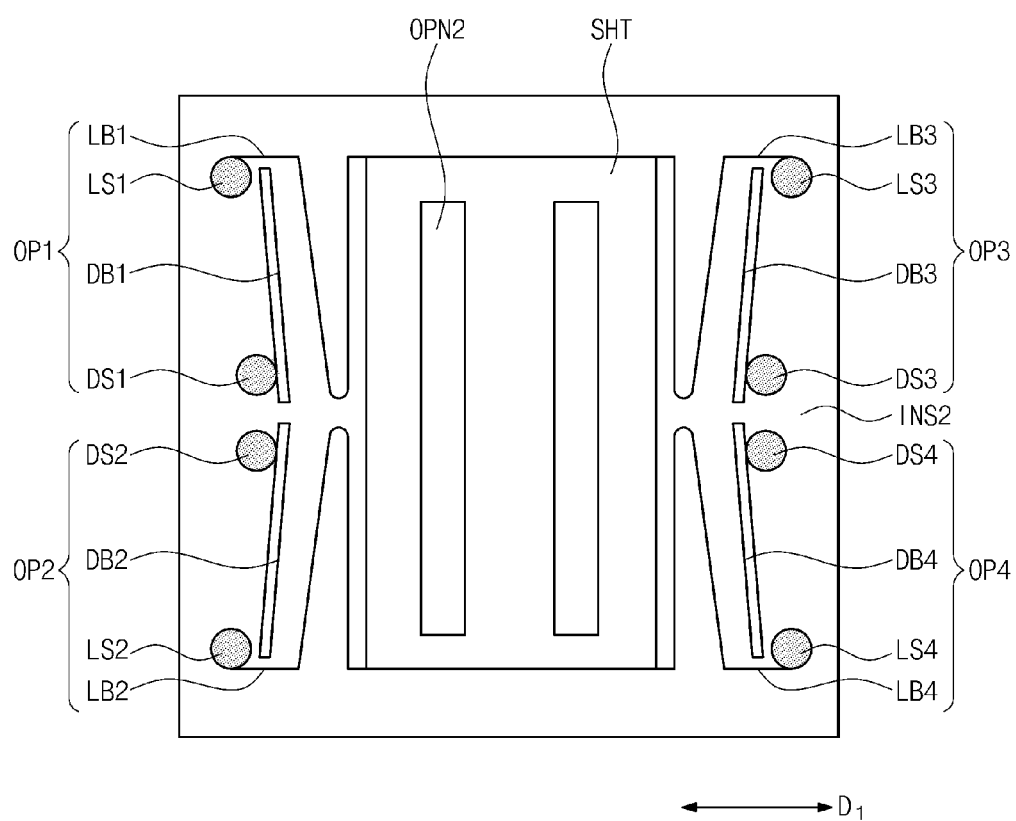
FIG. 3 is a plan view showing a shutter part according to an exemplary embodiment of the present invention.

FIG. 3 is a plan view showing a shutter part according to an exemplary embodiment of the present invention.

Referring to FIGS. 2 and 3, the shutter part SHTP is disposed on the second insulating substrate INS2 and moves to various positions on the second insulating substrate INS2 to transmit or block light. The shutter part SHTP includes a shutter SHT and an operator.

The shutter SHT has a flat plate shape and is disposed to be parallel to or substantially parallel to the upper surface of the second insulating substrate INK. The shutter SHT includes an opaque material to block the light. In the present exemplary embodiment, the shutter SHT has a rectangular shape when viewed in a plan view, but the shutter SHT is not limited to the rectangular shape. That is, the shutter SHT may have various shapes, such as a polygonal shape, a circular shape, an oval shape, an S shape, an irregular shape, etc.

In the following descriptions, a shutter having a rectangular shape with a pair of long sides and a pair of short sides is described as a representative example. The long sides are referred to as a first long side and a second long side. The first long side is disposed to face first and second operators OP1 and OP2 and the second long side is disposed to face third and fourth operators OP3 and OP4. In addition, a direction substantially perpendicular to the long sides is referred to as a first direction D1.

The shutter SHT includes at least one second opening OPN2 in the form of a polygonal shape, a circular shape, an oval shape, an S shape, or an irregular shape. According to an embodiment, when a plurality of the second openings OPN2 are provided, at least one of the second openings OPN2 has a different shape from the others. According to an embodiment, the first opening OPN1 may have a different shape from the second opening OPN2. Alternatively, the first and second openings OPN1 and OPN2 may have the same or substantially the shape.

The operator includes the first operator OP1, the second operator OP2, the third operator OP3, and the fourth operator OP4.

The first and second operators OP1 and OP2 are disposed adjacent to a side of the shutter SHT to move the shutter SHT and the third and fourth operators OP3 and OP4 are disposed adjacent to another side of the shutter SHT to move the shutter SHT in cooperation with the first and second operators OP1 and OP2. The first, second, third, and fourth operators OP1, OP2, OP3, and OP4 are independently operated from each other in response to first, second, third, and fourth voltages, respectively.

Each of the first, second, third, and fourth operators OP1, OP2, OP3, and OP4 includes a switching device, a deformable electrode, a deformable electrode supporter, a driving beam electrode, and a driving beam supporter.

The switching device (not shown) include a first switching device, a second switching device, a third switching device, and a fourth switching device, which are driven independent from each other. The first to fourth switching devices are disposed on the second insulating substrate to switch the shutter according to image signals. According to an embodiment, each switching device is a thin film transistor connected to signal lines transmitting the image signals. Although not shown in the figures, the signal lines include a gate line and a data line, and the thin film transistor is connected to the gate and data lines to apply a data voltage provided from the data line to the shutter in response to a gate-on signal from the gate line.

The deformable electrodes include first, second, third, and fourth deformable electrodes LB1, LB2, LB3, and LB4 respectively corresponding to the first, second, third, and fourth operators OP1, OP2, OP3, and OP4. Each of the first to fourth deformable electrodes LB1, LB2, LB3, and LB4 has a beam shape, for example, a rectangular or cylindrical beam shape, and elasticity. Referring to FIGS. 2 and 3, an end portion of each deformable electrode is connected to either one side or the other side of the shutter SHT. In addition, according to an embodiment, each deformable electrode is bent at least one time.

The first deformable electrode LB1 and the second deformable electrode LB2, which are connected to a first side of the shutter SHT, are separately or integrally formed from or with each other. Similarly, the third deformable electrode LB3 and the fourth deformable electrode LB4, which are connected to a second side of the shutter SHT, are separately or integrally formed from or with each other. According to an embodiment, each of the deformable electrodes LB1, LB2, LB3, and LB4 includes one or more layers. In the case that each deformable electrode LB1, LB2, LB3, and LB4 includes a plurality of layers, the layers included in each deformable electrode may include different materials from each other.

The deformable electrode supporters include first, second, third, and fourth deformable electrode supporters LS1, LS2, LS3, and LS4 respectively corresponding to the first, second, third, and fourth deformable electrodes LB1, LB2, LB3, and LB4. The first, second, third, and fourth deformable electrode supporters LS1, LS2, LS3, and LS4 are disposed on the second insulating substrate INS2 to support the first, second, third, and fourth deformable electrodes LB1, LB2, LB3, and LB4, respectively. Each of the first to fourth deformable electrode supporters LS1, LS2, LS3, and LS4 may have various shapes. According to an embodiment, the first, second, third, and fourth deformable electrode supporters LS1, LS2, LS3, and LS4 have a circular shape when viewed in a plan view as described in the following descriptions. However, the invention is not limited thereto.

The driving beam electrodes include first, second, third, and fourth driving beam electrodes DB1, DB2, DB3, and DB4 corresponding to the first, second, third, and fourth operators OP1, OP2, OP3, and OP4, respectively. Each of the first, second, third, and fourth driving beam electrodes DB1, DB2, DB3, and DB4 is provided in a beam shape, for example, a rectangular or cylindrical beam shape, and has elasticity. Each driving beam electrode may be provided in two extending elements as shown in FIG. 2, but is not limited to two elements. In the following descriptions, each driving beam electrode is described as one element. Each of the first to fourth driving beam electrodes DB1, DB2, DB3, and DB4 is disposed spaced apart from a corresponding deformable electrode of the first to fourth deformable electrodes LB1, LB2, LB3, and LB4 by a predetermined distance. Each of the first to fourth driving beam electrodes DB1, DB2, DB3, and DB4 is electrically connected to a corresponding switching device of the switching devices to move the corresponding deformable electrode using an attractive or repulsive force when first to fourth voltages are respectively applied to the first to fourth switching devices. The first and second driving beam electrodes DB1 and DB2 are positioned at an angle with respect to the first long side of the shutter SHT so that a shortest distance from first end portions of the first and second driving beam electrodes DB1 and DB2 to the first long side of the shutter SHT in the first direction D1 is shorter than a shortest distance from second end portions of the first and second driving beam electrodes DB1 and DB2 to the first long side of the shutter SHT in the first direction D1. Similarly, the third and fourth driving beam electrodes DB3 and DB4 are positioned at an angle with respect to the second long side of the shutter SHT so that a shortest distance from first end portions of the third and fourth driving beam electrodes DB3 and DB4 to the second long side of the shutter SHT in the first direction D1 is shorter than a shortest distance from second end portions of the third and fourth driving beam electrodes DB3 and DB4 to the second long side of the shutter SHT in the first direction D1. Each of the driving beam electrodes DB1, DB2, DB3, and DB4 may include one or more layers. In the case that each of the driving beam electrodes DB1, DB2, DB3, and DB4 includes a plurality of layers, the layers included in each driving beam electrode DB1, DB2, DB3, and DB4 may include different materials from each other.

The driving beam supporters include first, second, third, and fourth driving beam supporters DS1, DS2, DS3, and DS4 respectively corresponding to the first, second, third, and fourth driving beam electrodes DB1, DB2, DB3, and DB4. The first, second, third, and fourth driving beam supporters DS1, DS2, DS3, and DS4 are disposed on the second insulating substrate INS2 to support the first, second, third, and fourth driving beam electrodes DB1, DB2, DB3, and DB4, respectively. According to an embodiment, each of the first to fourth driving beam supporters DS1, DS2, DS3, and DS4 has the rectangular shape as shown in FIG. 2. Alternatively, the first, second, third, fourth driving beam supporters DS1, DS2, DS3, and DS4 may have a circular shape when viewed in a plan view, as shown in the other figures.

FIGS. 4A to 4D are plan views showing movement of a shutter according to an exemplary embodiment of the present invention.

Figure 4A:
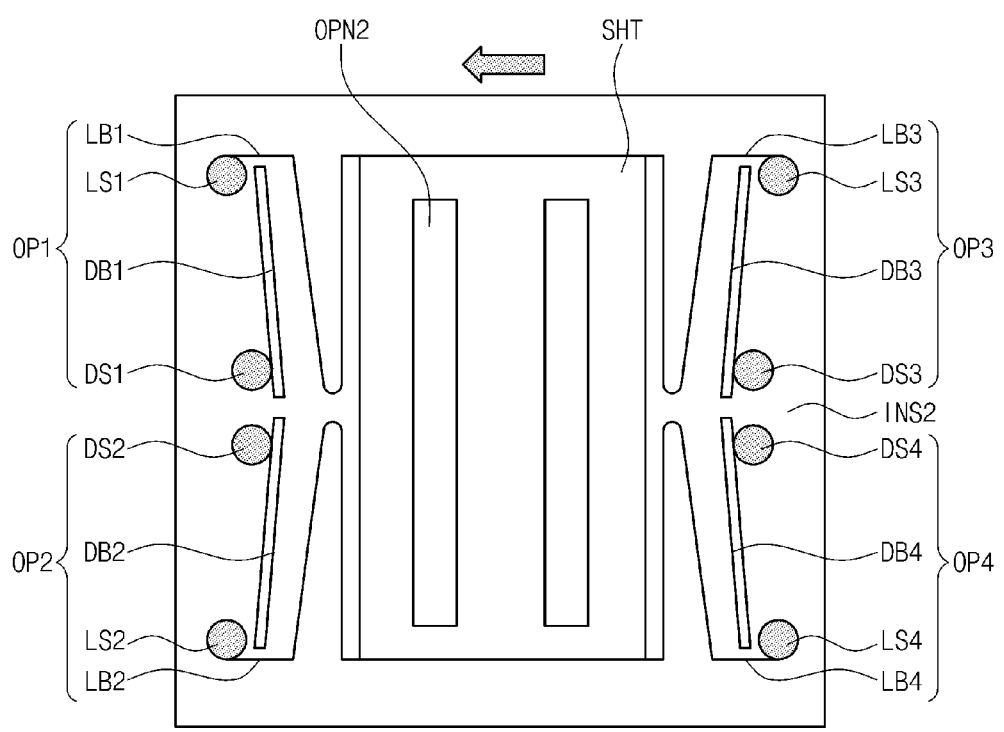
FIGS. 4A to 4D are plan views showing a movement of a shutter according to an exemplary embodiment of the present invention.

Referring to FIG. 4A, when the first and second voltages are respectively applied to the first and second operators OP1 and OP2, the shutter SHT moves toward the first and second operators OP1 and OP2 while being parallel to or nearly parallel to the upper surface of the second insulating substrate INS2. As a result, the second opening OPN2 overlaps the first opening OPN1 due to the movement of the shutter SHT and light emitted from the light source travels upward through the first and second openings OPN1 and OPN2. Thus, the display apparatus according to the present exemplary embodiment is in a turn-on state.

Figure 4B:
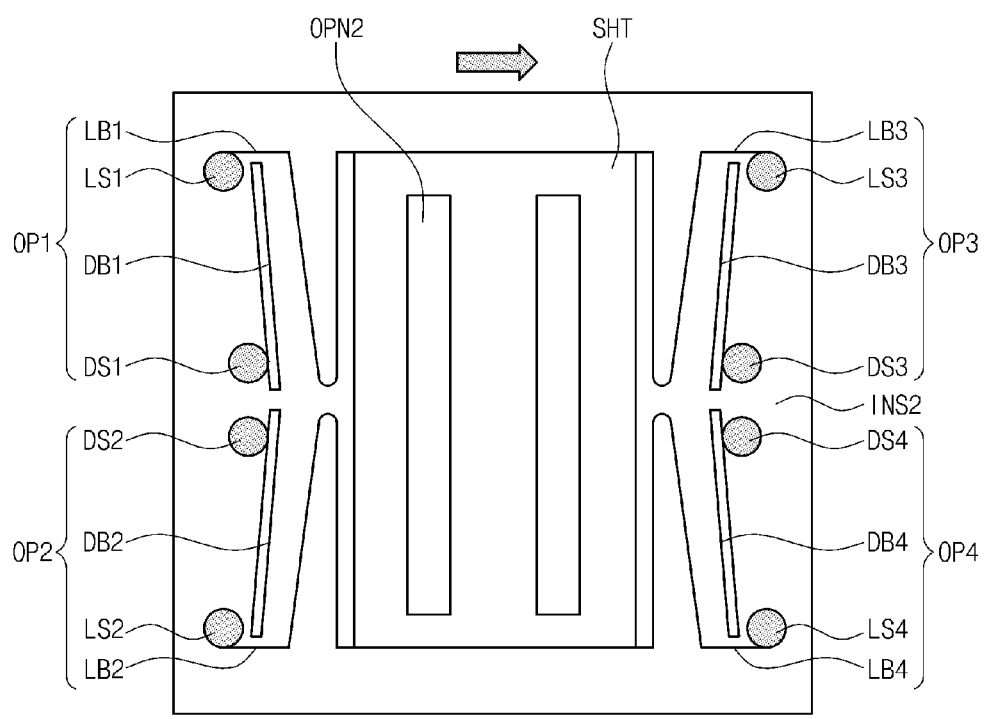

Referring to FIG. 4B, when the third and fourth voltages are applied to the third and fourth operators OP3 and OP4, respectively, the shutter SHT moves toward the third and fourth operators OP3 and OP4. As a result, the first opening OPN1 is not overlapped by the second opening OPN2 due to the movement of the shutter SHT, and the light emitted from the light source traveling upward from the lower portion with respect to the first opening OPN1 is reflected or absorbed by the shutter SHT. Accordingly, the display apparatus according to the present exemplary embodiment is in a turn-off state.

Figure 4C:
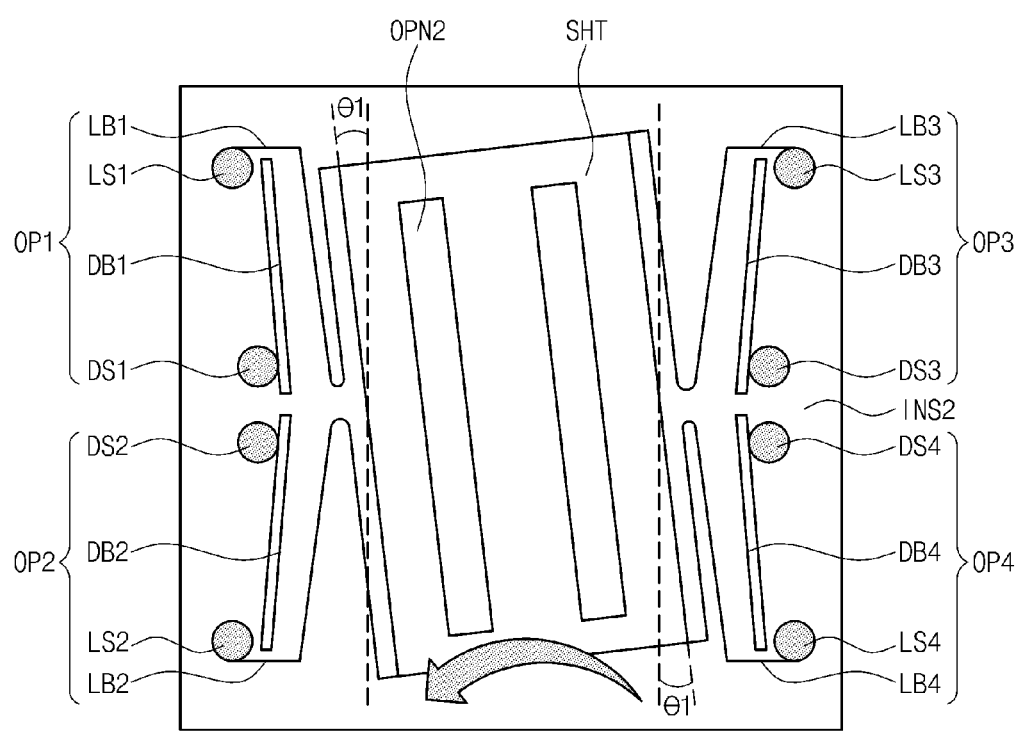

Referring to FIG. 4C, when the first and fourth voltages are respectively applied to the first and fourth operators OP1 and OP4, the shutter SHT is rotated to move toward the first and fourth operators OP1 and OP4 from the position before the first and fourth voltages are applied to the first and fourth operators OP1 and OP4. In FIG. 4C, the shutter SHT applied with the first and fourth voltages has been shown as an example, but the embodiments of the present invention are not limited thereto. For example, the shutter SHT may be rotated to move toward specific operators when one or more voltages are applied to the shutter SHT. Referring to FIG. 4C, the shutter SHT is rotated toward the first and fourth operators OP1 and OP4 by a first rotation angle θ1 from the position before the first and fourth voltages are applied to the first and fourth operators OP1 and OP4. As a result, the second opening OPN2 partially overlaps the first opening OPN1 due to the rotational movement of the shutter SHT, and thus a portion of the light traveling upward from the lower portion with respect to the first opening OPN1 passes through the first and second openings OPN1 and OPN2. Accordingly, the display apparatus displays a first intermediate gray scale different from when the display apparatus is in the turn-on or turn-off state.

Figure 4D:
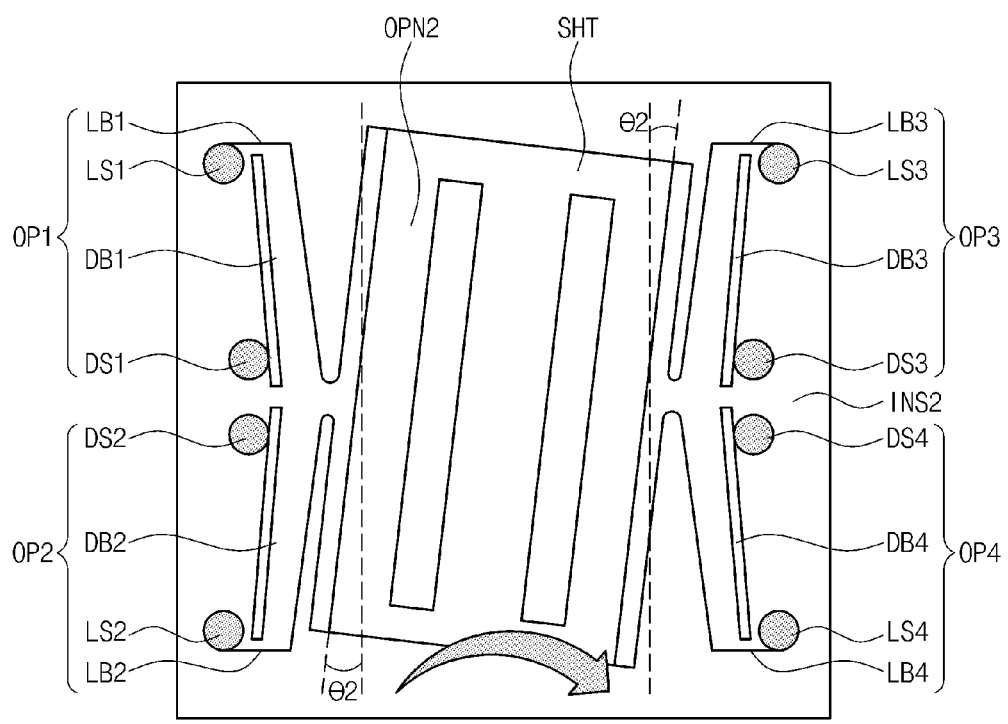

Referring to FIG. 4D, when the second and third voltages are respectively applied to the second and third operators OP2 and OP3, the shutter SHT is rotated to move toward the second and third operators OP2 and OP3 from the positions before the second and third voltages are applied to the second and third operators OP2 and OP3. In FIG. 4D, the shutter SHT applied with the second and third voltages has been shown as an example, but the embodiments of the present invention are not limited thereto. For example, the shutter SHT may be rotated while moving to specific operators when one or more voltages are applied to the shutter SHT. The shutter SHT is rotated to the second and third operators OP2 and OP3 by a second rotation angle θ2 from the position before the second and third voltages are applied to the second and third operators OP2 and OP3. The second rotation angle θ2 may be different from the first rotation angle θ1. That is, when the first and second rotation angles θ1 and θ2 are controlled, the overlap area between the first opening OPN1 and the second opening OPN2 may be adjusted. As described above, when the second opening OPN2 partially overlaps the first opening OPN1 due to the rotational movement of the shutter SHT, a portion of the light traveling upward from the lower portion with respect to the first opening OPN1 passes through the first and second openings OPN1 and OPN2. Thus, the display apparatus may display a second intermediate gray scale different from the first intermediate gray scale. Consequently, the display apparatus may display various gray scales, such as the gray scale of the turn-on state, the gray scale of the turn-off state, the first intermediate gray scale, the second intermediate gray scale, etc.

The shutter part shown in FIGS. 4A to 4D includes the first, second, third, and fourth operators OP1, OP2, OP3, and OP4.

Each of the first to fourth operators OP1, OP2, OP3, and OP4 includes a deformable electrode, a deformable electrode supporter, a driving beam electrode, and a driving beam supporter.

The first, second, third, and fourth deformable electrodes LB1, LB2, LB3, and LB4 respectively correspond to the first, second, third, and fourth operators OP1, OP2, OP3, and OP4. Each of the first, second, third, and fourth deformable electrodes LB1, LB2, LB3, and LB4 are bent at least one time. For instance, according to an embodiment, each of the first, second, third, and fourth deformable electrodes LB1, LB2, LB3, and LB4 are bent in a V shape, but the embodiments of the present invention are not limited to the V shape. for example, each of the first, second, third, and fourth deformable electrodes LB1, LB2, LB3, and LB4 may be bent in various shapes, e.g., a U shape, a W shape, to support the rotational movement of the shutter SHT.

The first, second, third, and fourth driving beam electrodes DB1, DB2, DB3, and DB4 correspond to the first, second, third, and fourth operators OP1, OP2, OP3, and OP4, respectively.

A shortest distance from first end portions of the first and second driving beam electrodes DB1 and DB2 to the first long side of the shutter SHT in the first direction D1 is shorter than a shortest distance from second end portions of the first and second driving beam electrodes DB1 and DB2 to the first long side of the shutter SHT in the first direction D1. Similarly, a shortest distance from first end portions of the third and fourth driving beam electrodes DB3 and DB4 to the second long side of the shutter SHT in the first direction D1 is shorter than a shortest distance from second end portions of the third and fourth driving beam electrodes DB3 and DB4 to the second long side of the shutter SHT in the first direction D1. According to the arrangement of the first, second, third, and fourth beam electrodes DB1, DB2, DB3, and DB4 in a pixel, a space in which the shutter SHT moves toward the first, second, third, and fourth operators OP1, OP2, OP3, and OP4 in the pixel may be established.

Referring to FIGS. 4A to 4D, the circuit configuration for the first, second, third, and fourth operators OP1, OP2, OP3, and OP4 is not limited to a specific circuit configuration, and the first, second, third, and fourth operators OP1, OP2, OP3, and OP4 may be independently operated from each other.

According to an embodiment, the shutter SHT shown in FIGS. 4A to 4D moves by applying the first to fourth voltages to an inverter circuit.

Figure 5:
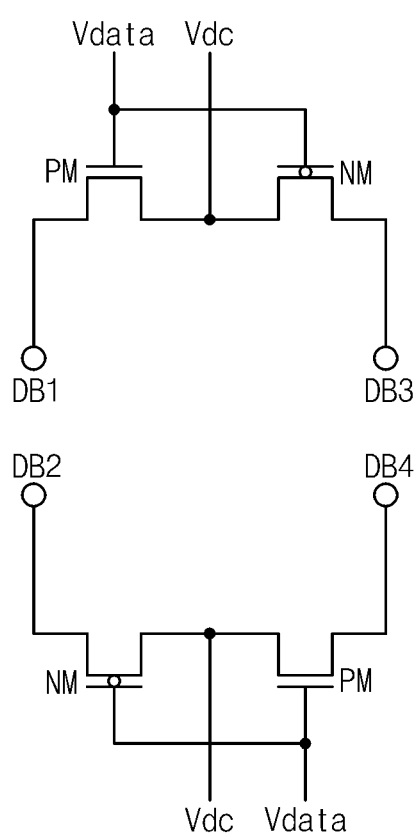
FIG. 5 is a circuit diagram showing an inverter circuit applied with first to fourth voltages.

FIG. 5 is a circuit diagram showing an inverter circuit applied with first to fourth voltages.

The applications of the first and second voltages (FIG. 4A), the third and fourth voltages (FIG. 4B), the first and fourth voltages (FIG. 4C), and the second and third voltages (FIG. 4D) can be performed by using the inverter circuit.

In detail, when a data voltage Vdata applied to a PMOS transistor (PM) and an NMOS transistor (NM) of the inverter circuit is controlled after a uniform reference voltage is applied to the inverter circuit as a driving voltage Vdc, the direction of the movement of the shutter SHT is determined. In addition, according to an embodiment, two or more NMOS transistors are connected to each other in series, and the thin film transistors can be stably driven.

Figure 6A:
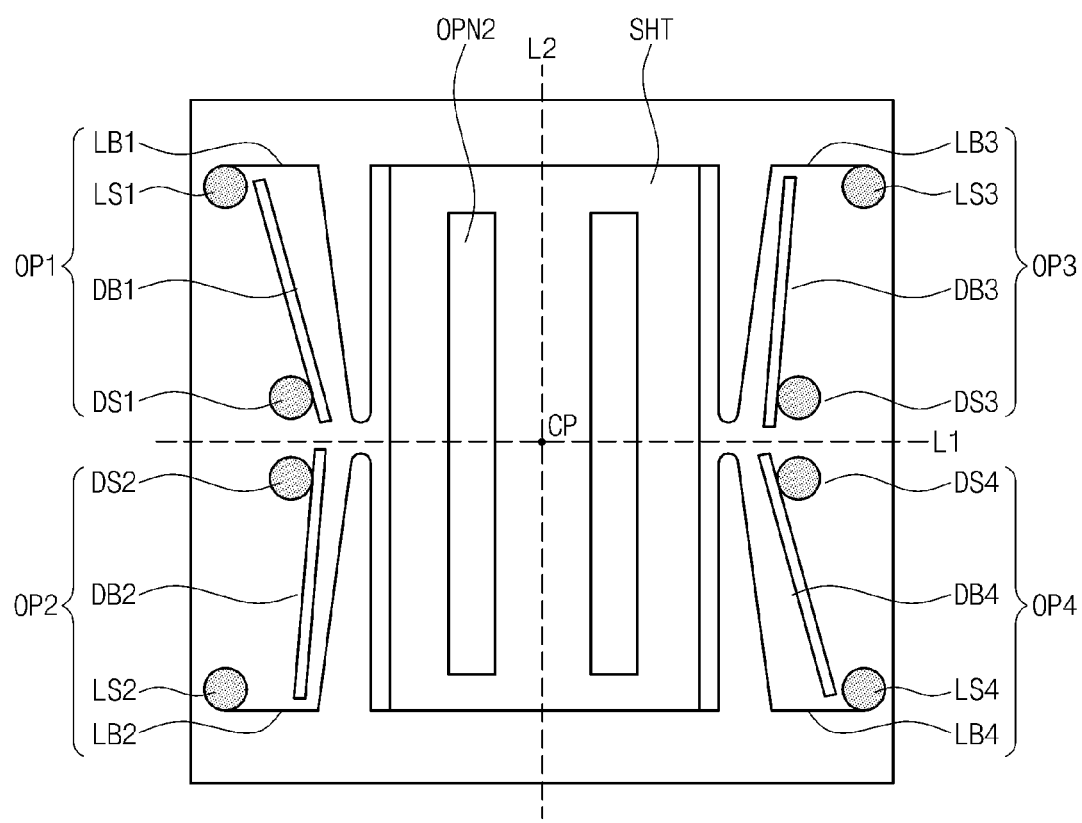
FIGS. 6A and 6B are plan views showing a shutter part according to exemplary embodiments of the present invention.
Figure 6B:
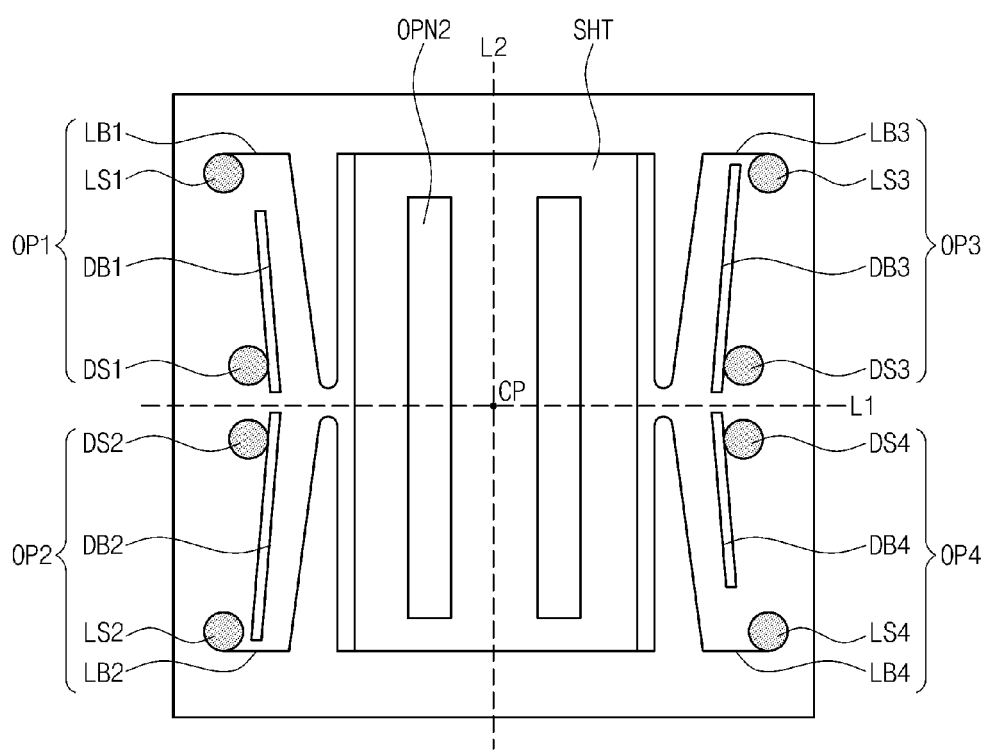

FIGS. 6A and 6B are plan views showing a shutter part according to exemplary embodiments of the present invention. In FIGS. 6A and 6B, the same reference numerals denote the same or similar elements in FIGS. 4A to 4D. In detail, the shutter, the deformable electrodes, the deformable electrode supporters, and the driving beam supporters included in the shutter part shown in FIGS. 6A and 6B have the same structure and function as those shown in FIGS. 4A to 4D, except for the driving beam electrodes.

Referring to FIG. 6A, the first, second, third, and fourth driving beam electrodes DB1, DB2, DB3, and DB4 respectively correspond to the first, second, third, and fourth operators OP1, OP2, OP3, and OP4. As shown in FIG. 6A, the first and fourth driving beam electrodes DB1 and DB4 are asymmetrical with the second and third driving beam electrodes DB2 and DB3 with respect to a first line L1 crossing a center portion of the long sides of the shutter SHT, a second line L2 crossing a center portion of the short sides of the shutter SHT, and a crossing point CP at which the first line L1 meets the second line L2. However, the embodiments of the present invention are not limited to this configuration. For example, the asymmetries may be between more or less driving beam electrodes, and with respect to more or less than the first and second lines L1 and L2, and crossing point CP. For example, according to different embodiments, one or more driving beam electrodes of the first, second, third, and fourth driving beam electrodes DB1, DB2, DB3, and DB4 may be asymmetrical or symmetrical with the other driving beam electrodes with reference to the first line L1, the second line L2, and/or the crossing point CP.

Depending on the configuration of the driving beam electrodes and their symmetry or lack thereof with respect to each other, the driving beam electrodes can provide different spaces from each other, in which the shutter SHT may be rotated.

Referring to FIG. 6B, the first, second, third, and fourth driving beam electrodes DB1, DB2, DB3, and DB4 respectively correspond to the first, second, third, and fourth operators OP1, OP2, OP3, and OP4. According to an embodiment of the present invention, the first and fourth driving beam electrodes DB1 and DB4 have a length different from that of the second and third driving beam electrodes DB2 and DB3. However, the embodiments of the present invention are not limited to this configuration. For example, one or more of the first to fourth driving beam electrodes DB1, DB2, DB3, and DB4 can have a different length from the other driving beam electrodes.

Accordingly, the one or more driving beam electrodes and the other driving beam electrodes, which have the different lengths from each other, can provide different attractive forces to the first, second, third, and fourth deformable electrodes LB1, LB2, LB3, and LB4.

As a result, due to the differences between the driving beam electrodes, the rotational angle when the shutter SHT is rotated to move toward the first and fourth operators OP1 and OP4 from the position before at least one voltage is applied can be different from the rotational angle when the shutter SHT is rotated to move toward the second and third operators OP2 and OP3 from the position before the at least one voltage is applied. Thus, the display apparatus according to the present exemplary embodiment can display at least two intermediate gray scales different from each other.

Figure 7A:
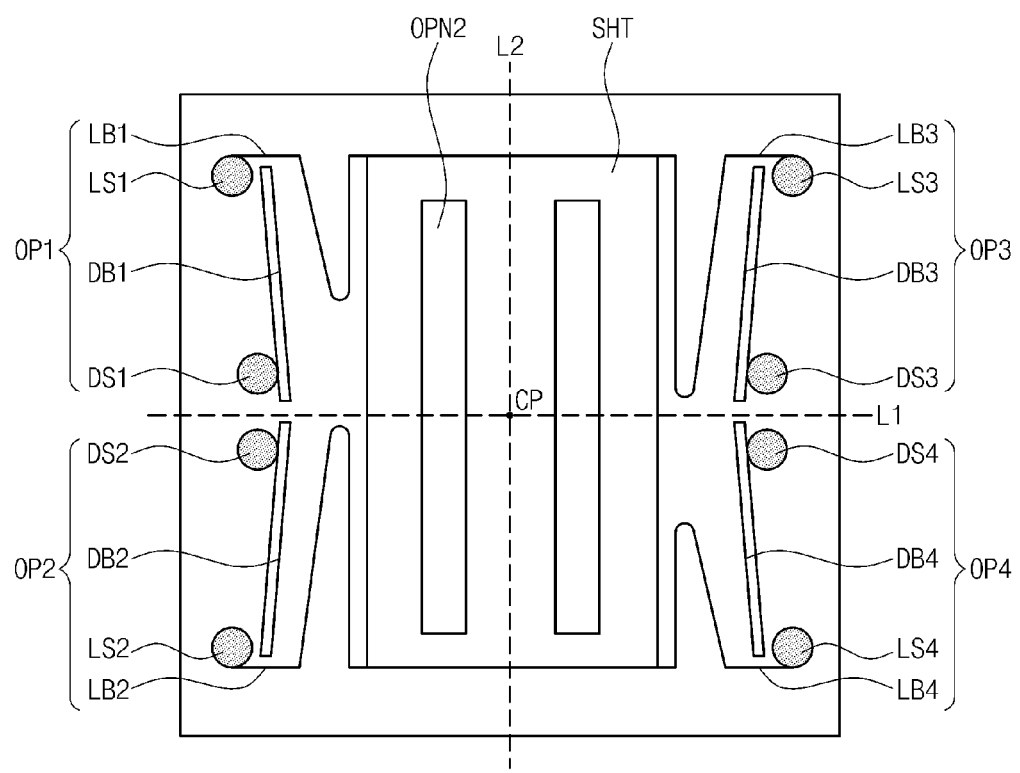
FIGS. 7A and 7B are plan views showing a shutter part according to exemplary embodiments of the present invention.
Figure 7B:
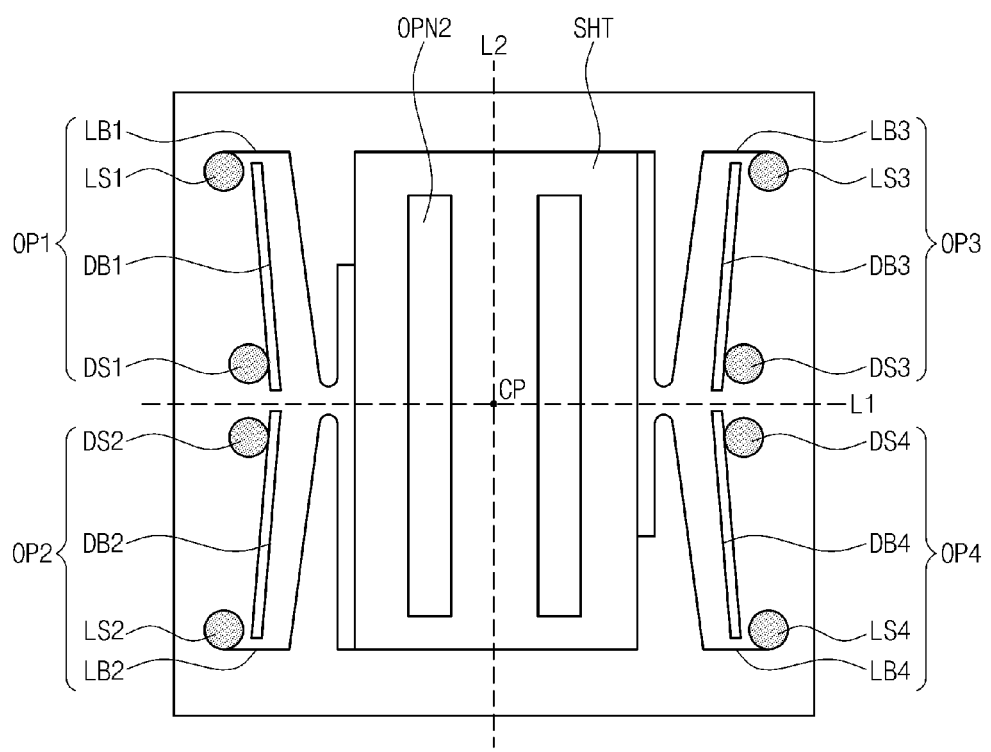

FIGS. 7A and 7B are plan views showing a shutter part according to exemplary embodiments of the present invention. In FIGS. 7A and 7B, the same reference numerals denote the same or similar elements as in FIGS. 4A to 4D. The shutter, the deformable electrode supporters, the driving beam electrodes, and the driving beam supporters included in the shutter part shown in FIGS. 7A and 7B have the same structure and function as those shown in FIGS. 4A to 4D except for the deformable electrodes.

The first, second, third, and fourth deformable electrodes LB1, LB2, LB3, and LB4 respectively correspond to the first, second, third, and fourth operators OP1, OP2, OP3, and OP4.

Referring to FIG. 7A, the first and fourth deformable electrodes LB1 and LB4 are asymmetrical with the second and third deformable electrodes LB2 and LB3 with respect to a first line L1 crossing a center portion of the long sides of the shutter SHT, a second line L2 crossing a center portion of the short sides of the shutter SHT, and a crossing point CP at which the first line L1 meets the second line L2. However, the embodiments of the present invention are not limited thereto. For example, one or more of the deformable electrodes of the first, second, third, and fourth deformable electrodes LB1, LB2, LB3, and LB4 may be asymmetrical with the other deformable electrodes with respect to the first line L1, the second line L2, and/or the crossing point CP.

The first and fourth deformable electrodes LB1 and LB4 have a length different from that of the second and third deformable electrodes LB2 and LB3. However, the embodiments of the present invention are not limited thereto. For example, one or more of the first to fourth deformable electrodes LB1, LB2, LB3, and LB4 may have a different length from the other deformable electrodes.

Referring to FIG. 7B, according to an embodiment, the position at which the first and second deformable electrodes LB1 and LB4 are connected to a first side or a second side of the shutter SHT is different from the position at which the second and third deformable electrodes LB2 and LB3 are connected to the first side or the second side of the shutter SHT. Alternatively, the position at which one of the first, second, third, or fourth deformable electrodes LB1, LB2, LB3, and LB4 is connected to the first side or the second side of the shutter SHT is different from the position at which the other deformable electrodes are connected to the first side or the second side of the shutter. In another alternative all of the first through fourth deformable electrodes LB1, LB2, LB3 and LB4 are connected to the first or second sides of the shutter SHT at different positions.

The first to fourth deformable electrodes LB1, LB2, LB3, and LB4 can be bent in different shapes. As shown in FIGS. 7A and 7B, at least one of the first to fourth deformable electrodes LB1, LB2, LB3, and LB4 can be bent in a V shape. However, the embodiments of the present invention are not limited thereto, For example, each of the first, second, third, and fourth deformable electrodes LB1, LB2, LB3, and LB4 can be bent in various shapes, e.g., a U shape, a W shape, etc., to support the rotational movement of the shutter SHT.

Accordingly, the at least one deformable electrode and the other deformable electrodes, which are asymmetrical with each other with respect to the first line L1 crossing the center portion of the long sides of the shutter SHT, the second line L2 crossing the center portion of the short sides of the shutter SHT, and the crossing point at which the first line L1 meets the second line L2, can be differently folded or spread out according to the rotational movement of the shutter SHT.

As a result, the rotational angle when the shutter SHT is rotated to move toward the first and fourth operators OP1 and OP4 from the position before at least one voltage is applied can be different from the rotational angle when the shutter SHT is rotated to move toward the second and third operators OP2 and OP3 from the position before the at least one voltage is applied. Thus, the display apparatus according to the present exemplary embodiment can display at least two intermediate gray scales different from each other.

Figure 8:
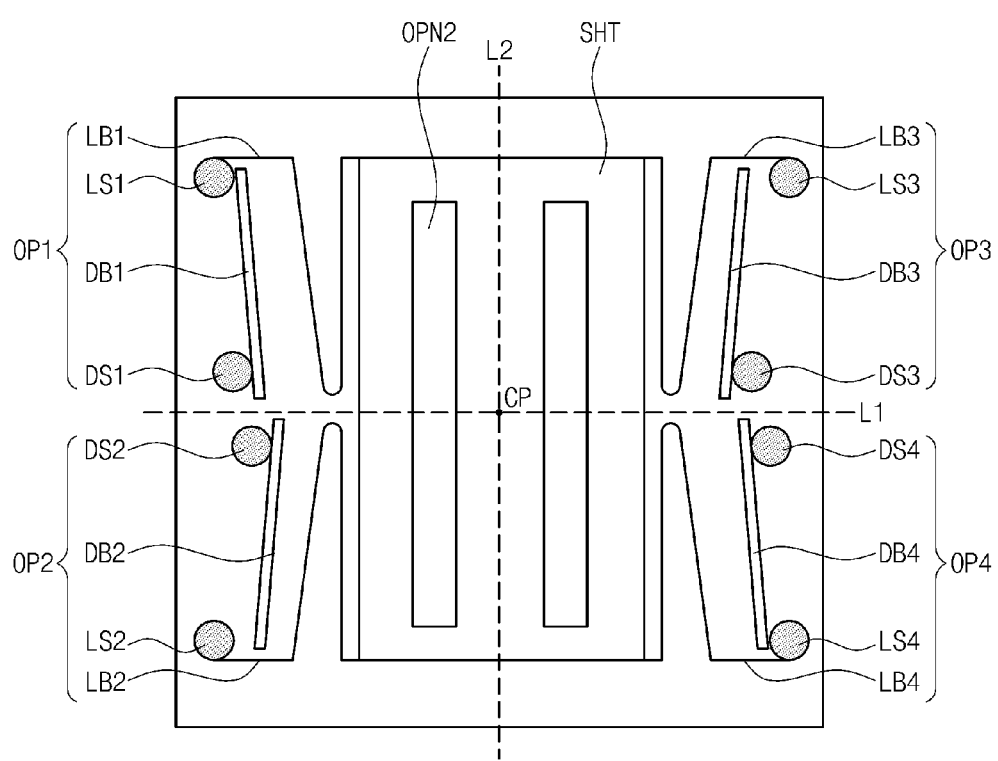
FIG. 8 is a plan view showing a shutter part according to an exemplary embodiment of the present invention.

FIG. 8 is a plan view showing a shutter part according to an exemplary embodiment of the present invention. In FIG. 8, the same reference numerals denote the same or similar elements in FIGS. 4A to 4D. The shutter, the deformable electrodes, the deformable electrode supporters, and the driving beam electrodes included in the shutter part shown in FIG. 8 have the same structure and function as those shown in FIGS. 4A to 4D except for the driving beam supporters.

Referring to FIG. 8, the driving beam supporters are disposed on the second insulating substrate INS2, and include first, second, third, fourth driving beam supporters DS1, DS2, DS3, and DS4 respectively corresponding to the first, second, third, and fourth driving beam electrodes DB1, DB2, DB3, and DB4 to respectively support the first, second, third, and fourth driving beam electrodes DB1, DB2, DB3, and DB4. The first and fourth driving beam supporters DS1 and DS4 are asymmetrical with the second and third driving beam supporters DS2 and DS3 with respect to a first line L1 crossing a center portion of the long sides of the shutter SHT, a second line L2 crossing a center portion of the short sides of the shutter SHT, and a crossing point CP at which the first line L1 meets the second line L2. However, the embodiments of the present invention are not limited thereto, For example, one or more driving beam supporters of the first, second, third, and fourth driving beam supporters DS1, DS2, DS3, and DS4 are asymmetrical with the other driving beam supporters with reference to the first line L1 crossing the center portion of the long sides of the shutter SHT, the second line L2 crossing the center portion of the short sides of the shutter SHT, and/or the crossing point CP at which the first line L1 meets the second line L2.

The one or more driving beam supporters which are asymmetrical with each other with reference to the first line L1, the second line L2, and/or the crossing point CP, provide the different spaces from each other, in which the shutter SHT may be rotated.

As a result, the rotational angle when the shutter SHT is rotated to move toward the first and fourth operators OP1 and OP4 from the position before at least one voltage is applied can be different from the rotational angle when the shutter SHT is rotated to move toward the second and third operators OP2 and OP3 from the position before the at least one voltage is applied. Thus, the display apparatus according to the present exemplary embodiment can display at least two intermediate gray scales different from each other.

Figure 9:
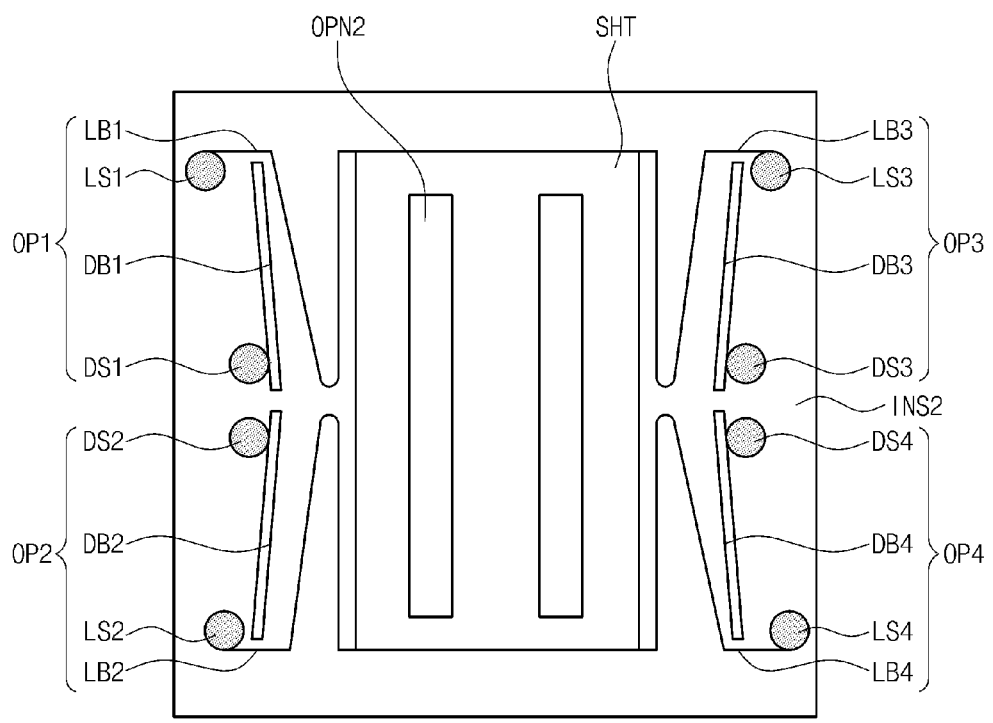
FIG. 9 is a plan view showing a shutter part according to an exemplary embodiment of the present invention.

FIG. 9 is a plan view showing a shutter part according to an exemplary embodiment of the present invention. In FIG. 9, the same reference numerals denote the same or similar elements in FIGS. 4A to 4D. The shutter, the deformable electrodes, the driving beam electrodes, and the driving beam supporters included in the shutter part shown in FIG. 9 have the same structure and function as those shown in FIGS. 4A to 4D except for the deformable electrode supporters.

Referring to FIG. 9, the deformable electrode supporters are disposed on the second insulating substrate INK, and include first, second, third, fourth deformable electrode supporters LS1, LS2, LS3, and LS4 respectively corresponding to the first, second, third, and fourth deformable electrodes LB1, LB2, LB3, and LB4 to respectively support the first, second, third, and fourth deformable electrodes LB1, LB2, LB3, and LB4. The first and fourth deformable electrode supporters LS1 and LS4 are asymmetrical with the second and third deformable electrode supporters LS2 and LS3 with respect to a first line L1 crossing a center portion of the long sides of the shutter SHT, a second line L2 crossing a center portion of the short sides of the shutter SHT, and a crossing point CP at which the first line L1 meets the second line L2.

However, the embodiments of the present invention are not limited thereto, For example, one or more deformable electrode supporters of the first, second, third, and fourth deformable electrode supporters LS1, LS2, LS3, and LS4 is asymmetrical with the other deformable electrode supporters with reference to the first line L1 crossing the center portion of the long sides of the shutter SHT, the second line L2 crossing the center portion of the short sides of the shutter SHT, and/or the crossing point CP at which the first line L1 meets the second line L2.

Accordingly, the one or more deformable electrode supporters and the other deformable electrode supporters, which are asymmetrical with each other with reference to the first line L1 crossing the center portion of the long sides of the shutter SHT, the second line L2 crossing the center portion of the short sides of the shutter SHT, and/or the crossing point at which the first line L1 meets the second line L2, can be differently folded or spread out according to the rotational movement of the shutter SHT.

As a result, the rotational angle when the shutter SHT is rotated to move toward the first and fourth operators OP1 and OP4 from the position before at least one voltage is applied can be different from the rotational angle when the shutter SHT is rotated to move toward the second and third operators OP2 and OP3 from the position before the at least one voltage is applied. Thus, the display apparatus according to the present exemplary embodiment can display at least two intermediate gray scales different from each other.

Figure 10A:
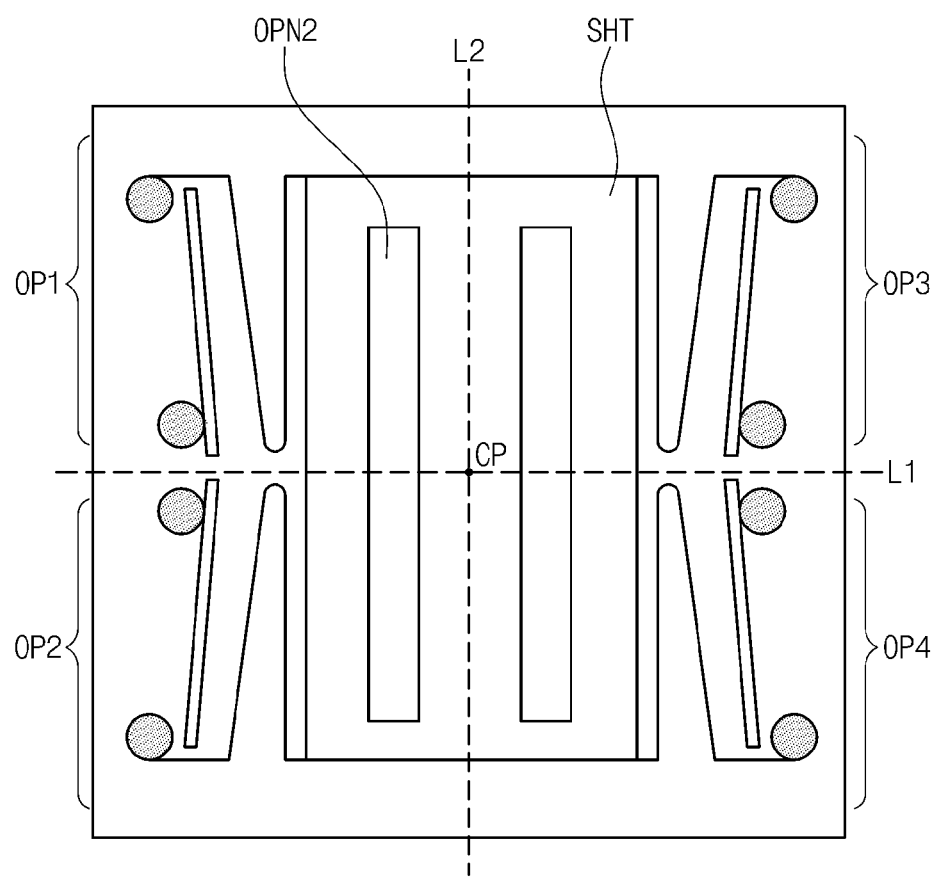
FIG. 10A is a plan view showing a shutter part according to an exemplary embodiment of the present invention.
Figure 10B:
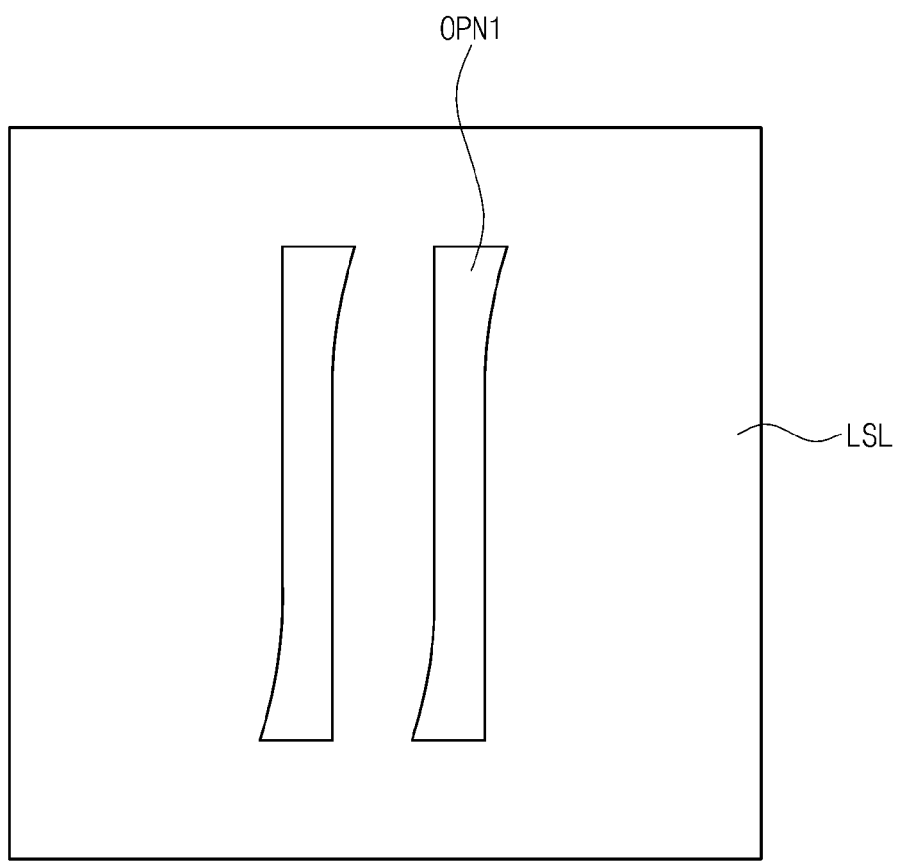
FIG. 10B is a plan view showing a light blocking layer provided with a first opening according to an exemplary embodiment of the present invention.

FIG. 10A is a plan view showing a shutter part provided with a second opening according to an exemplary embodiment of the present invention, and FIG. 10B is a plan view showing a light blocking layer provided with a first opening according to an exemplary embodiment of the present invention.

Referring to FIGS. 10A and 10B, the shutter SHT moves by first, second, third, and fourth operators OP1, OP2, OP3, and OP4 to control the overlap area between the first opening OPN1 and the second opening OPN2, thereby reflecting or transmitting the light that is transmitted toward the openings OPN1 and OPN2 from, for example, an outside source. According to an exemplary embodiment, the overlap area when the shutter SHT is rotated to move toward the first and fourth operators OP1 and OP4 from the position before the first to fourth voltages are applied can be different in size from the overlap area when the shutter SHT is rotated to move toward the second and third operators OP2 and OP3 from the position before the first to fourth voltages are applied.

In FIGS. 10A and 10B, the first opening OPN1 has a rectangular slit shape that is deformed and the second opening OPN2 has a rectangular slit shape that is not deformed. However, the embodiments of the present invention are not limited thereto, For example, each of the first opening OPN1 and the second opening OPN2 may have various shapes, such as a polygonal shape, a circular shape, an oval shape, an S shape, an irregular shape, etc. In addition, when a plurality of the first openings OPN1 are provided, at least one of the first openings OPN1 may have a different shape from the other first openings. Similarly, when a plurality of the second openings OPN2 are provided, at least one of the second openings OPN2 may have a different shape from the other second openings.

Accordingly, although the rotational angle when the shutter SHT is rotated to move toward the first and fourth operators OP1 and OP4 from the position before at least one voltage is applied is equal to the rotational angle when the shutter SHT is rotated to move toward the second and third operators OP2 and OP3 from the position before the at least one voltage is applied, the display apparatus according to the present exemplary embodiment may display at least two intermediate gray scales different from each other since the first opening OPN1 has the different shape from the shape of the second opening OPN2.

As described above, according to embodiments of the present invention, the display apparatus may display not only the gray scales of the turn-on and turn-off states but also an intermediate gray scale or at least two intermediate gray scales different from each other. Thus, the display apparatus according to the exemplary embodiments may be driven in three or four bits.

Therefore, the display apparatus according to embodiments of the present invention can display the gray scales at a relatively low driving speed, and thus power consumption of the display apparatus may be reduced.

In addition, since the driving margin in the display apparatus may be improved, the amorphous silicon (a-Si) process may be applied.

Although the exemplary embodiments of the present invention have been described, it is to be understood that the present invention should not be limited to these exemplary embodiments but various changes and modifications can be made by one ordinary skilled in the art within the spirit and scope of the present invention as hereinafter claimed.

What is claimed is:

1. A display apparatus comprising:
a first insulating substrate;
a light blocking layer disposed on the first insulating substrate and including a first opening through which light is capable of being transmitted;
a second insulating substrate facing the first insulating substrate; and
a shutter part disposed on the second insulating substrate, the shutter part comprising:
a shutter provided with a second opening formed through the shutter;
a first operator and a second operator disposed adjacent to a first side of the shutter to move the shutter; and
a third operator and a fourth operator disposed adjacent to a second side of the shutter to move the shutter, wherein the first, second, third, and fourth operators are operated independent of each other in response to first, second, third, and fourth voltages, respectively.

2. The display apparatus of claim 1, wherein the shutter has a rectangular shape with a pair of long sides and a pair of short sides, and the long sides comprise:
a first long side facing the first and second operators; and
a second long side facing the third and fourth operators.

3. The display apparatus of claim 2, wherein each of the first, second, third, and fourth operators comprises:
a driving beam electrode applied with a corresponding voltage of the first, second, third, and fourth voltages; and
a deformable electrode connected to the shutter, and moving when the corresponding voltage is applied to the driving beam electrode.

4. The display apparatus of claim 3, wherein the driving beam electrodes comprise first, second, third, and fourth driving beam electrodes respectively corresponding to the first, second, third, and fourth operators, and the deformable electrodes comprise first, second, third, and fourth deformable electrodes respectively corresponding to the first, second, third, and fourth operators.

5. The display apparatus of claim 4, wherein the first deformable electrode is integrally formed with the second deformable electrode and the third deformable electrode is integrally formed with the fourth deformable electrode.

6. The display apparatus of claim 4, wherein the shutter is rotated to move toward at least one operator of the first, second, third, and fourth operators by applying at least one of the first, second, third, or fourth voltages to a corresponding driving beam electrode.

7. The display apparatus of claim 4, wherein each of the first, second, third, and fourth deformable electrodes is bent at least one time.

8. The display apparatus of claim 4, wherein a shortest distance from a first end portion of each of the first and second driving beam electrodes to the first long side of the shutter in a first direction is shorter than a shortest distance from a second end portion of each of the first and second driving beam electrodes to the first long side of the shutter in the first direction, and a shortest distance from a first end portion of each of the third and fourth driving beam electrodes to the second long side of the shutter in the first direction is shorter than a shortest distance from a second end portion of each of the third and fourth driving beam electrodes to the second long side of the shutter in the first direction.

9. The display apparatus of claim 6, wherein a rotational angle when the shutter is rotated to move toward the first and fourth operators with respect to a position before at least one voltage is applied is different from a rotational angle when the shutter is rotated to move toward the second and third operators with respect to the position before the at least one voltage is applied.

10. The display apparatus of claim 9, wherein at least one driving beam electrode of the first, second, third, and fourth driving beam electrodes is asymmetrical with remaining driving beam electrodes of the first, second, third, and fourth driving beam electrodes with respect to a first line crossing a center portion of the long sides, a second line crossing a center portion of the short sides, and a crossing point at which the first line meets the second line.

11. The display apparatus of claim 9, wherein at least one driving beam electrode of the first, second, third, or fourth driving beam electrodes has a length different from remaining driving beam electrodes of the first, second, third, and fourth driving beam electrodes.

12. The display apparatus of claim 9, wherein at least one deformable electrode of the first, second, third, and fourth deformable electrodes is asymmetrical with remaining deformable electrodes of the first, second, third, and fourth deformable electrodes with respect to a first line crossing a center portion of the long sides, a second line crossing a center portion of the short sides, and a crossing point at which the first line meets the second line.

13. The display apparatus of claim 9, wherein at least one deformable electrode of the first, second, third, or fourth deformable electrodes has a length different from remaining deformable electrodes of the first, second, third, and fourth driving beam electrodes.

14. The display apparatus of claim 9, wherein the shutter part further comprises:

first, second, third, and fourth driving beam supporters disposed on the second insulating substrate to respectively support the first, second, third, and fourth driving beam electrodes; and first, second, third, and fourth deformable electrode supporters disposed on the second insulating substrate to respectively support the first, second, third, and fourth deformable electrodes.

15. The display apparatus of claim 14, wherein at least one driving beam supporter of the first, second, third, and fourth driving beam supporters is asymmetrical with remaining driving beam supporters of the first, second, third, and fourth driving beam supporters with respect to a first line crossing a center portion of the long sides, a second line crossing a center portion of the short sides, and a crossing point at which the first line meets the second line.

16. The display apparatus of claim 14, wherein at least one deformable electrode supporter of the first, second, third, and fourth deformable electrode supporters is asymmetrical with remaining deformable electrode supporters of the first, second, third, and fourth deformable electrode supporters with respect to a first line crossing a center portion of the long sides, a second line crossing a center portion of the short sides, and a crossing point at which the first line meets the second line.

17. The display apparatus of claim 1, wherein the first, second, third, and fourth voltages are respectively applied to the shutter part by an inverter circuit.

18. The display apparatus of claim 1, wherein the first opening has a polygonal shape, a circular shape, an oval shape, an S shape, or an irregular shape.

19. The display apparatus of claim 1, wherein the second opening has a polygonal shape, a circular shape, an oval shape, an S shape, or an irregular shape.

20. The display apparatus of claim 1, wherein the first opening has a shape different from a shape of the second opening.

21. A display apparatus comprising:
a first insulating substrate;
a light blocking layer disposed on the first insulating substrate and including a first opening through which light is capable of being transmitted;
a second insulating substrate facing the first insulating substrate; and
a shutter part disposed on the second insulating substrate, the shutter part comprising:
  a shutter provided with a second opening formed through the shutter;
  a first operator disposed adjacent to a first side of the shutter to move the shutter; and
  a second operator disposed adjacent to a second side of the shutter to move the shutter, wherein the shutter rotates toward the first operator at a first angle with respect to a reference point in response to a first voltage, and rotates toward the second operator at a second angle with respect to the reference point in response a second voltage to partially overlap the first opening with the second opening.

\* \* \* \* \*